*J. S. Patric*     *Vulcanizing Form.*

No. 120,093.     Patented Oct. 17, 1871.

Witnesses:
Geo. B. Selden.
James N. Paige.

Inventor:
John S. Patric
By W. S. Longbbaugh & Co
Attys. Rochester N.Y.

UNITED STATES PATENT OFFICE.

JOHN S. PATRIC, OF ROCHESTER, NEW YORK.

IMPROVEMENT IN VULCANIZING RUBBER SACKS FOR STOCK-PUMPS.

Specification forming part of Letters Patent No. 120,093, dated October 17, 1871.

*To all whom it may concern:*

Be it known that I, JOHN S. PATRIC, of Rochester, in the county of Monroe and State of New York, have invented certain Improvements in Forms for Vulcanizing Rubber Sacks, of which the following is a specification:

The object of my invention is to provide a means of forming and vulcanizing the rubber sacks used as plungers in the stock-pumps, for which several patents have been granted to me; and it consists more especially in the employment of a wholly or partially-hollow fire-proof mold, over which the plastic rubber or rubber cloth is stretched and attached in a peculiar manner, to be afterward placed in the vulcanizing-oven.

Figure 1:
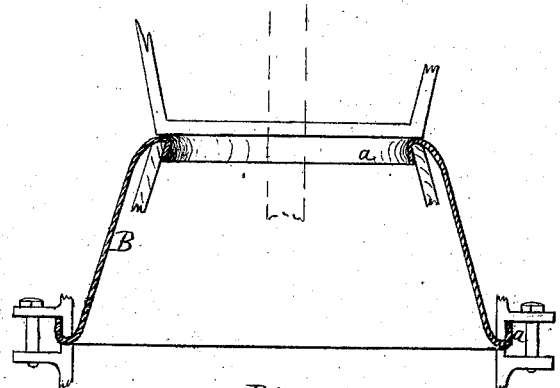
Figure 2:
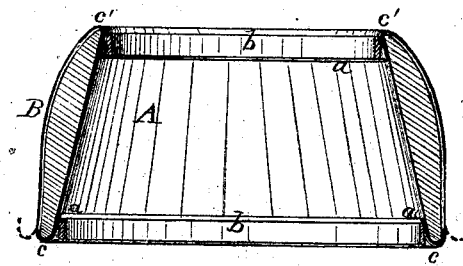
Figure 3:
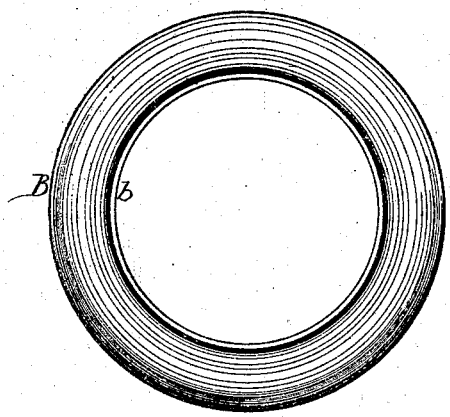

In the drawing, Figure 1 is a sectional view of the sack as now used in the pumps above mentioned. Fig. 2 is a vertical section of my improved form, over which the sack is shown as stretched and fastened ready for the vulcanizing process. Fig. 3 is a plan view of the same.

Much trouble has formerly been experienced in the manufacture of the sacks mentioned, on account of the difficulty in securing the requisite form after vulcanizing, and also in stretching and fastening the material to the mold previously to placing it in the vulcanizing-oven. These molds or forms were formerly made of wood, and the material nailed to them at the edges. By this method, however, the mold was soon badly split by the use of the nails, and the wood became charred and shrunken by the action of heat when in the oven. In addition to this, it was impossible to make the molds in such a shape as to form the flaps $a$, Figs. 1 and 2, at the edges of the sack with a short turn, as shown, which is very desirable, in order to have the parts of the pump go together properly. To obviate these difficulties, I construct the mold A, Fig. 2, of iron, stone-ware, or other suitable fire-proof material, in a hollow conical shape, as indicated, the length of which is equal to the length of the sack after the flaps are turned over. The edges of the mold are rounded slightly, and are of a thickness to correspond with the required turn of the flaps, and the plastic sheets of rubber or rubber-cloth B, are strained tightly upon outside of the form and over these rounded edges, terminating within the mold, as shown. In this position the sheet is fastened at each end by rings $b$, Figs. 2 and 3, fitted to enter the ends of the mold and clamp the rubber against its inner face. These rings are forced into the extremities of the mold and draw the sack evenly over it. The short turns at the points $c\ c'$, Fig. 2, are well adapted to the attachment of the sacks to the piston C and barrel D of the pump, as may be seen by reference to Fig. 1, and they can only be readily and cheaply formed by the use of the hollow or partially-hollow mold, the lower flap $c$ being easily reversed, as shown in dotted lines in Fig. 2, and retaining its form perfectly, whether turned inward or outward. Thus, by molding the flaps $a$ in the manner shown, the sack, after vulcanizing, is ready to be attached to the pump without stretching or fitting of any kind. By the use of the rings $b$ the material is very evenly strained over the mold, obviating a serious difficulty met with in attaching the sheets to wooden forms with nails, as heretofore practiced, by which it is impossible to stretch it uniformly and retain it in such position. My improved method also produces a form of sack perfectly adapted to its uses, and which is ready for application immediately after vulcanizing. It will be seen that disks may be used in place of rings $b$, for clamping the rubber to the mold; but the rings are preferable, being lighter and cheaper.

What I claim as my invention, is—

1. The method of forming and vulcanizing rubber sacks for stock-pumps, by means of the wholly or partially hollow mold A, composed of a suitable fire-proof material, over the edges of which the flaps $a$ of the sack are turned, for the purposes set forth.

2. In combination with the hollow vulcanizing mold A, the clamping-rings $b$, operating substantially as described.

JOHN S. PATRIC.

Witnesses:
F. H. CLEMENT,
WILLIAM M. BATES.